United States Patent
Santa Cruz et al.

[11] Patent Number: 5,984,160
[45] Date of Patent: Nov. 16, 1999

[54] MULTIPURPOSE CRAFTSMAN'S PORTABLE WORKSTATION

[76] Inventors: Cathy D. Santa Cruz, 401 Canyon Way, #43, Sparks, Nev. 89434; Harold L. Long, 1502 N. Carson #4, Carson City, Nev. 89701

[21] Appl. No.: 09/115,021

[22] Filed: Jul. 14, 1998

[51] Int. Cl.[6] .................................................. B23K 37/00
[52] U.S. Cl. .............................. 228/6.1; 228/33; 269/71
[58] Field of Search .................................. 228/6.2, 44.3, 228/44.7, 51, 6.1, 33; 269/71, 76, 97, 901

[56] References Cited

U.S. PATENT DOCUMENTS

| | | | |
|---|---|---|---|
| 3,849,945 | 11/1974 | Lindzy | 51/229 |
| 4,028,967 | 6/1977 | Fried | 81/7 |
| 4,176,778 | 12/1979 | Fortune | 228/57 |
| 4,295,640 | 10/1981 | Merrell | 269/47 |
| 4,744,552 | 5/1988 | Glaser | 269/71 |
| 4,762,979 | 8/1988 | Geoffroi | 228/51 |
| 4,854,039 | 8/1989 | Wendt | 29/832 |
| 5,048,742 | 9/1991 | Fortune | 228/51 |
| 5,285,948 | 2/1994 | Rupp et al. | 228/6.2 |
| 5,297,717 | 3/1994 | Parry | 228/55 |
| 5,535,878 | 7/1996 | Reed | 206/6.1 |

*Primary Examiner*—Samuel M. Heinrich

[57] ABSTRACT

This invention is substantially an all purpose workstation suitable for use by electricians, jewelers, etc. The workstation is portable, and attachable to a work bench, or the like. The workstation includes specific tools commonly used in these trades, such as a solder pad container, a ring mandrel, and gripping members.

8 Claims, 3 Drawing Sheets

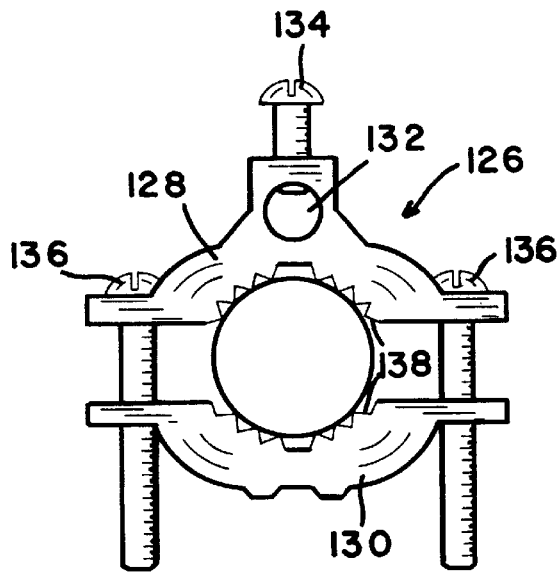
FIG. 3
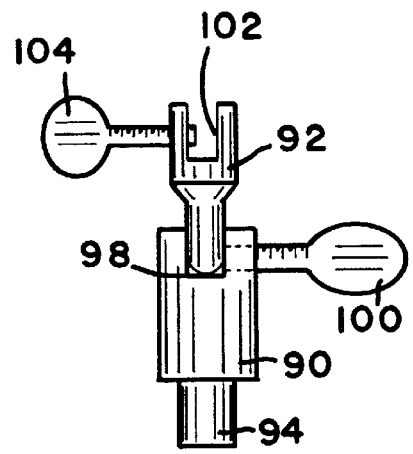
FIG. 4
FIG. 6
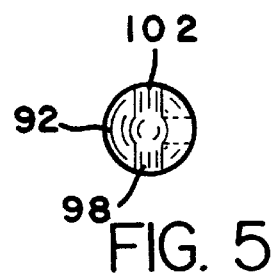
FIG. 5
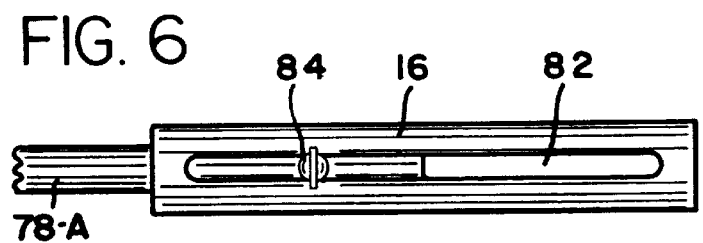
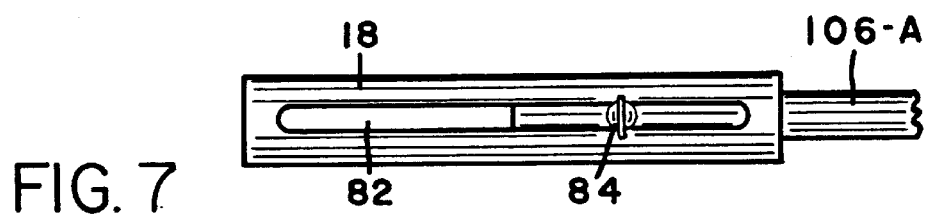
FIG. 7

MULTIPURPOSE CRAFTSMAN'S PORTABLE WORKSTATION

FIELD OF THE INVENTION

This invention relates to portable workstations, but more particularly pertains to a workstation which is designed specifically for skilled craftsmen, such as jewelers or electricians, and which provides in combination instruments typically used within their profession.

BACKGROUND OF THE INVENTION

Craftsman, such as jewelers or electricians are highly skilled individuals, and while working on jewelry or electronics they must perform extremely precise work. Also, it is very critical that they do not make any mistakes, as the materials are much to costly to replace if accidentally damaged.

Therefore, there is a need to provide a workstation for such craftsmen which is portable, convenient and highly efficient, and which allows them to adjustably position their work thereon, in a very secure manner.

Furthermore, such a workstation should include in combination, a base, a removable adjustable anvil block, an adjustable C-clamp for removably attaching the base to substantially a worktable, first and second adjustable attachment means for attaching either a gripping member and/or a ring mandrel thereon, a solder pad container and solder pad, such as taught by the present invention.

Nowhere in the prior art did the applicants find any portable workstation which includes the unique combination as described above. Nor did we find any workstation which is specifically designed for use by jewelers, electricians, or more specifically a workstation for soldering. Nor did we find a workstation which is completely adjustable, such as taught by the present invention.

The most pertinent references found by the applicants are U.S. Pat. Nos. 4,744,552, 4,028,967 and 3,849,945. Each of which are specifically designed for use by a jeweler. However, none of the noted references provide the unusual results and unique advantages as taught by the present invention, as will be seen within the following specification.

SUMMARY OF THE INVENTION

It is therefore an object of the present invention to provide a workstation which is portable, and which is especially useful for electricians, computer technicians, jewelers, or any profession which involves soldering.

It is a further object of the present invention to provide a workstation, which includes a combination of specific tools typically used within such professions, as noted above.

It is yet another object of the present invention to provide a workstation that is removably attachable to a workbench, worktable, or the like.

It is a further object of the present invention to provide a workstation which includes a solder pad container for housing a solder pad therein.

Still a further object of the present invention is to provide a workstation which is completely adjustable between various positions of choice.

Yet a very important object of the present invention is to provide a workstation which holds a work-piece in a very secure manner.

Still another object of the present invention is to provide at least a first and a second adjustable attachment means for removably, adjustably attaching in combination, either a first and a second pair of gripping members, such as tweezers, and/or in combination a gripping member and a ring mandrel simultaneously, to the workstation.

Still another object of the present invention is to provide a workstation which is easily disassembled and thus, very portable.

Yet another object of the present invention is to provide a workstation which of a convenient size and shape.

Also, another object of the present invention is to provide a workstation which allows a craftsman to position a work-piece thereon at substantially any suitable position of choice.

Yet another object of the present invention is to provide a workstation which can be made from substantially any suitable material of choice, such as metal, aluminum, plastic, wood, etc.

BRIEF DESCRIPTION OF THE DRAWINGS

FIG. 3, is substantially an enlarged view of a ring mandrel support.

FIG. 4, is substantially an enlarged view of a gripping member support.

FIG. 5, is substantially a top end view of the gripping member.

FIG. 6, is substantially a bottom view of a base member.

FIG. 7, is substantially a bottom view of a second base member.

DETAILED DESCRIPTION OF THE DRAWINGS

Referring now in detail to the drawings wherein like numerals refer to like elements throughout the various views.

The present invention is substantially a multipurpose craftsmen's portable workstation and is substantially represented throughout the various views by arrow (10). it is to be noted that the workstation can be made from substantially any suitable material of engineering choice, such as metal, plastic, wood, etc.

Figure 1:
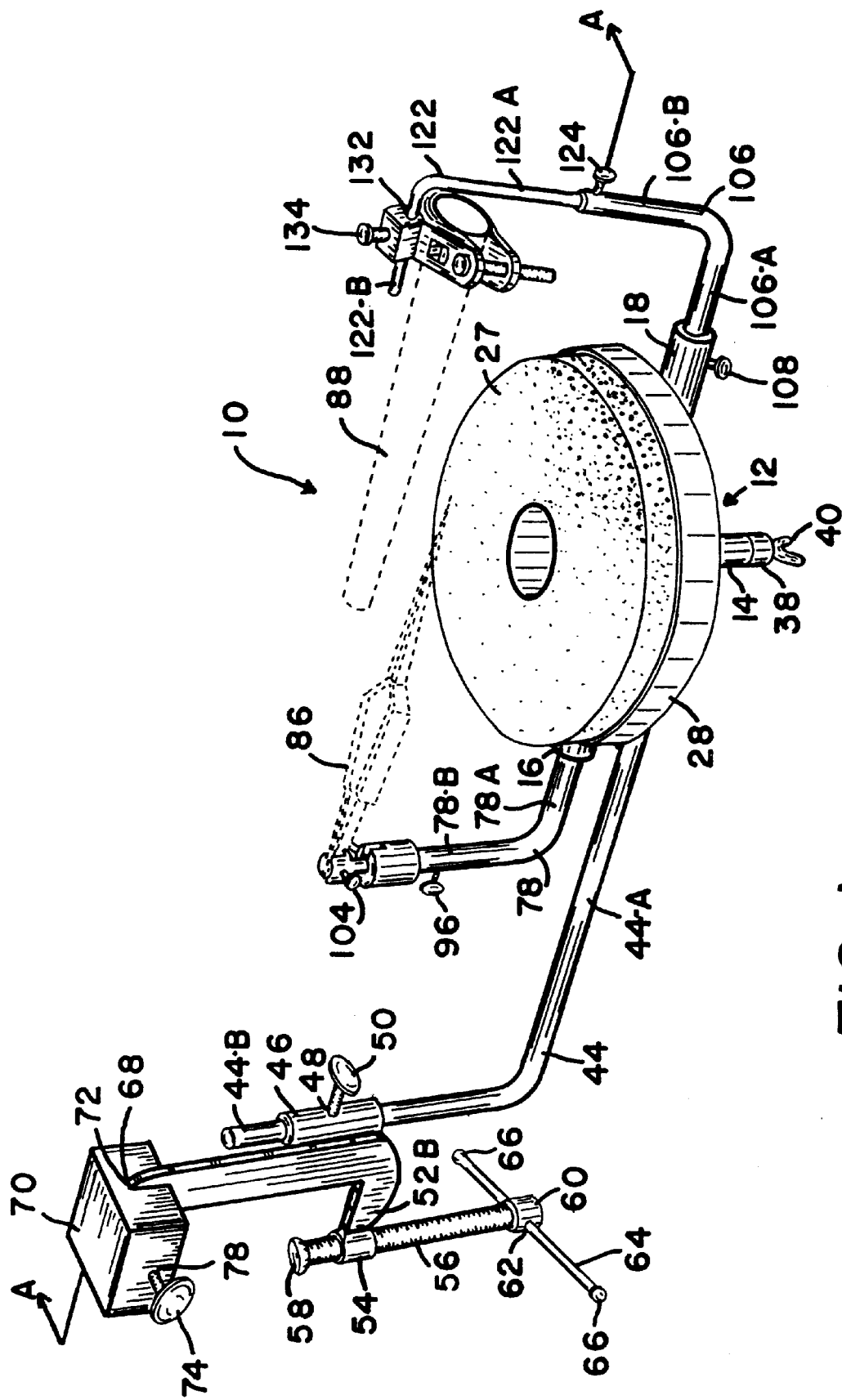
FIG. 1 is substantially a perspective view of the present invention.
Figure 2:
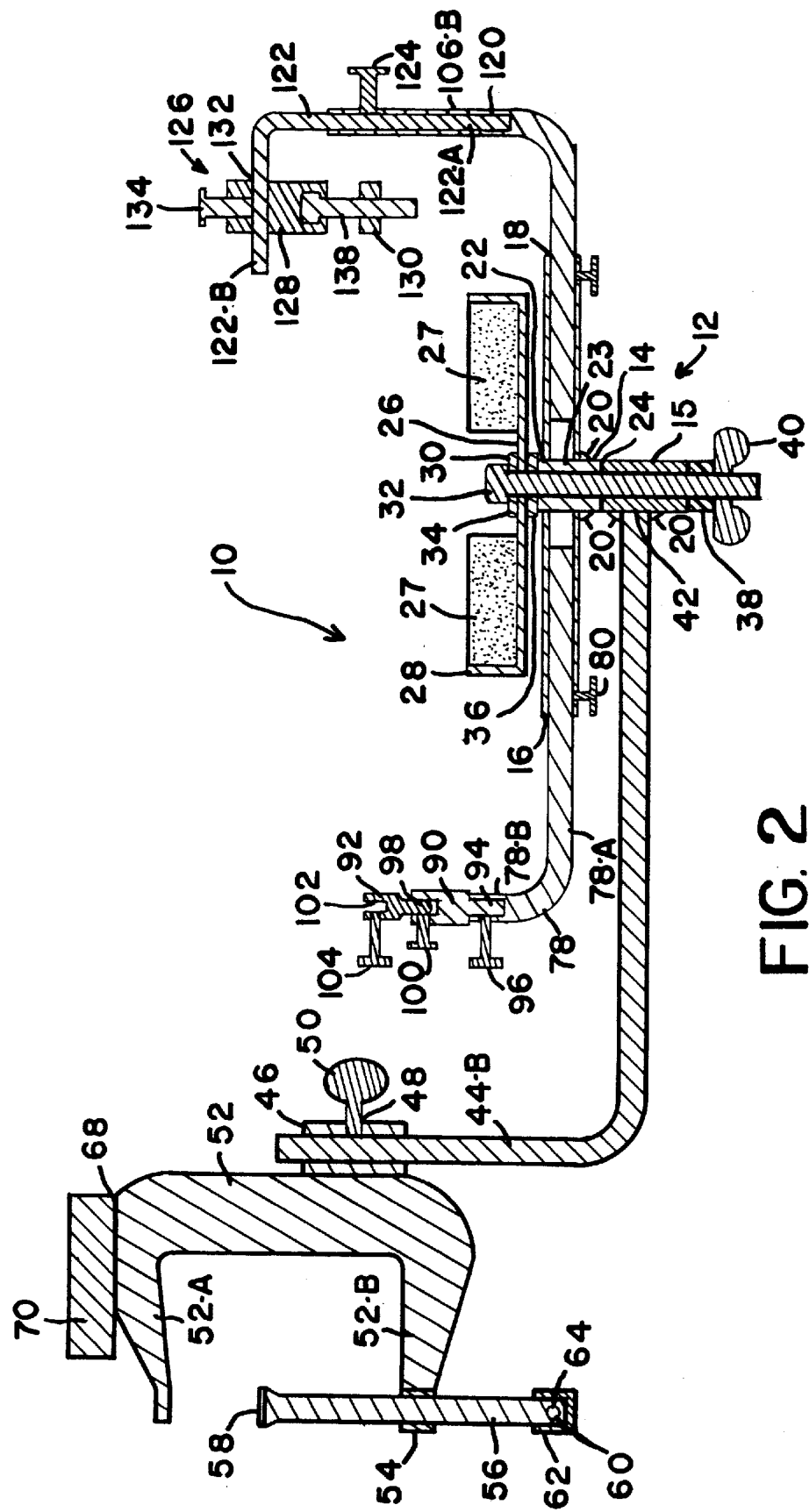
FIG. 2 is substantially a cross-sectional view taken at A—A of FIG. 1.

FIGS. 1 & 2 substantially represent the preferred embodiment for the present invention comprising of the following: substantially a T-shaped base portion represented by (arrow 12), comprising of: a first vertical tubular member (14); a second vertical tubular member (15); a first horizontal tubular member (16); and a second horizontal tubular member (18), which in combination substantially form T-shaped base portion, as represented by (arrow 12).

First vertical tubular member (14) having a top end (22), a bottom end (24), and substantially a central section (23). Central section (23) of first vertical tubular member (14), is fixedly attached to first horizontal member (16) and second horizontal member (18), such as by welding (20) or the like, with members (16 & 18) being substantially opposed to each other.

Vertical tubular member (14) is fixedly yet removably attached to a solder pad housing (26) by any suitable attachment means of engineering choice.

Solder pad housing (26) may be substantially made into any suitable shape or size of engineering choice, but as we have herein shown, a circular housing having a raised vertical outside rim (28), is most appropriate and functional for containing and housing a typical solder pad (27). Solder pad housing (26) further includes substantially a centrally located vertical bore (30) there through.

The last noted attachment means for fixedly yet removably attaching vertical tubular member (14) to solder pad housing (26), is by inserting a threaded bolt (32) into and through each of the following: a first washer (34); bore (30); a second washer (36); vertical tubular member (14); second vertical tubular member (15); and a third washer (38), with bolt (32) being substantially secured in place by a wing nut (40). It will now be seen that first vertical tubular member (14) is now fixedly attached to solder pad housing (26). However, second vertical tubular member (15) is capable of rotating 360 degrees horizontally around bolt (32).

In FIGS. 1 & 2, (44) is an elongated substantially first L-shaped support arm having a horizontal long leg (44-A) and a vertical short leg (44-B), with horizontal long leg (44-A) being fixedly attached to substantially a central section (42) of second horizontal tubular member (15), such as by welding (20), or the like.

First L-shaped support arm (44) having attachment means for removably adjustably attaching a C-clamp (52) to first L-shaped support arm. With the attachment means comprising: vertical short leg (44-B) of first L-shaped support arm (44) being removably adjustably slidably engaged within a third vertical tubular member (46) which includes substantially a threaded horizontal bore (48) there through, and bore (48) being of a shape and size to receive a threaded thumb screw (50) therein. Thus, third vertical tubular member (46) is vertically adjustable and can be completely horizontally rotated 360 degrees around vertical short leg (44-B).

Third vertical tubular member (46) is fixedly attached by welding (not shown), or by any suitable attachment means, to substantially a typical C-clamp (52) having a first horizontal leg (52-A) and a second horizontal leg (52-B). C-clamp (52) further includes attachment means for removably adjustably attaching C-clamp (52) to the edge of a worktable (not shown), or the like. Last noted attachment means comprising of the following: Horizontal leg (52-B) having substantially a forth vertical tubular member (54) fixedly attached thereon, such as by welding (not shown). Forth vertical tubular member (54) being of a shape and size to vertically receive there through the threaded portion of an elongated bolt (56), and bolt (56) having substantially a flattened head (58) on its first end and a tubular stop means (60) fixedly attached on its second end. Tubular stop means (60) having a horizontal bore (62) there through which is of a shape and size to slidably receive therein an elongated bar (64). Elongated bar (64) includes on each of its ends ball shaped stop means (66), each of which are of a size larger than the interior of bore (62). Thus, elongated bar (64) is fixedly attached within tubular stop means (60), yet bar (64) is slidably adjustable.

It will now be seen when the edge of a worktable (not shown) is positioned between legs (52-A & 52-B) of C-clamp (52), and bar (64) is manually rotated counter clockwise, flat head (58) is urged upward toward leg (52-A) until flat head (58) contacts the underside of the worktable (not shown). Whereby, flat head (58) and leg (52-A) capture edge of the worktable in secure manner, and thus C-clamp (52) is attached yet removably secured to the worktable.

C-clamp (52) further includes on leg (52-A) a flat section (68) for mounting an anvil block (70) thereon. Anvil block (70) includes substantially an elongated horizontal recess (72) therein which is of a shape and size to slidably receive flat section (68) therein, and anvil block (70) is fixedly yet removably attached to flat section (68) of C-clamp (52) by threaded thumb screw (74) (see FIG. 1), which is threadably inserted into bore (78) within anvil block (70).

In FIGS. 1, 2 & 6, (78) is a second elongated substantially L-shaped support arm having a horizontal long leg (78-A) and a vertical short leg (78-B). First horizontal tubular member (16) having attachment means for removably slidably attaching second L-shaped support arm (78) to first horizontal tubular member (16), with the attachment means comprising: First horizontal tubular member (16) being of a shape and size to slidably receive long leg (78-A) therein and is fixedly attached thereto by a bore which is of a shape and size to receive a threaded bolt (80) therein, as seen in FIG. 2.

However, we also provide in a second embodiment, as shown in FIG. 6, a different attachment means to slidably engage long leg (78-A) within first horizontal member (16). Wherein horizontal member (16) includes an elongated slot (82) and leg (78-A) includes a threadably engaged pin (84) which allows leg (78-A) to be slidably adjustably retained within slot (82) within horizontal member (16).

Vertical short leg (78-B) is removably attachable to a gripping device, such as a pair of prior art tweezers (86 as shown in ghost lines within FIG. 1).

Second L-shaped support arm (78) having attachment means for removably adjustably attaching a gripping member such as tweezers (86) to second L-shaped support arm, with the attachment means comprising: a vertical tubular insert member (90) and a second vertical tubular insert member (92) having a ball joint extension. Vertical insert member (90) (clearly shown within FIG. 4) having substantially a bottom end which includes substantially an integrally formed vertical protrusion (94) which is of a shape and size to be slidably engaged within short leg (78-B). Short leg (78-B) having a threaded horizontal bore there through which is of a shape and size to threadably receive first threaded thumb screw (96) therein (see FIG. 2), which removably yet fixedly attaches protrusion (94) to short leg (78-B). Vertical insert member (90) (clearly shown within FIG. 4) having substantially a top end (clearly shown within FIG. 5) which includes substantially a horizontal recess (98) there through, which is of a shape and size to slidably removably receive substantially the ball joint extension of member (92) therein. Recess (98) includes a threaded horizontal bore therein which is of a shape and size to threadably receive a second thumb screw (100), which removably pivotably attaches the ball joint extension of member (92) to first vertical tubular insert member (90). Second vertical tubular insert member (92) includes substantially a horizontal recess (102) there through for removably receiving prior art tweezers (86) therein. Horizontal recess (102) includes substantially a horizontal threaded bore which is of a shape and size to threadably receive a thumb screw (104) therein, which removably yet fixedly attaches prior art tweezers to second vertical tubular insert member (92).

It will now be seen that prior art tweezers (86) are completely adjustable between various positions of user choice, as the attachment means as described above provides variable rotational positioning of first vertical tubular insert member (90), second vertical tubular insert member (92) and prior art tweezers (86).

Second horizontal tubular member (18) having attachment means for removably slidably attaching a third L-shaped support arm (106) to second horizontal tubular member (18), with the attachment means comprising: third elongated substantially L-shaped support arm (106) having a horizontal long leg (106-A) and a vertical short leg (106-B). Second horizontal tubular member (18) is of a shape and size to slidably receive long leg (106-A) therein and is fixedly attached thereto by a bore which is of a shape and size to receive a threaded bolt (108) therein, as seen in FIG. 2.

Third support arm (106) having attachment means for removably adjustably attaching a ring mandrel (88) to third support arm (106) with the attachment means comprising: a fourth substantially L-shaped support arm (122) having substantially a vertical long leg (122-A) and substantially a horizontal short leg (122-B). Vertical short leg (106-B) having a vertical bore (120) (shown in FIG. 2) therein which is of a shape and size to slidably receive vertical long leg (122-A) therein. Vertical bore (120) (shown in FIG. 2) having substantially a horizontal threaded bore there through, which is of a shape and size to threadably receive threaded screw (124) therein, which fixedly removably slidably attaches vertical long leg (122-A) to vertical long leg (106-B) of third support arm (106).

In FIG. 3, we show a ring mandrel support assembly (arrow 126), having a top bracket (128) and a bottom bracket (130). Top bracket (128) includes substantially a horizontal bore (132) there through which is of a shape and size to slidably receive short leg (122-B) therein. Bore (132) includes a vertical threaded bore therein which is of a shape and size to threadably receive a second threaded screw (134) therein which fixedly removably slidably attaches top bracket (128) to horizontal short leg (122-B) of fourth support arm (122). Top bracket (128) and bottom bracket (130) are removably fixedly adjustably attached together by multiple vertical threaded bores there through which are of a shape and size to threadably receive therein elongated threaded screws (136). Top bracket (128) and bottom bracket (130) each include substantially a half circular toothed recess (138) which when combined form substantially a circle, which is of a shape and size to slidably receive ring mandrel (88) therein. Thus, ring mandrel is removably, adjustably fixedly attached to ring mandrel support assembly (arrow 126) which is removably adjustably fixedly attached to fourth support arm (122).

Shown within FIG. 7, we provide second horizontal tubular member (18) with different means to slidably engage long leg (106-A) therein. Wherein horizontal member (18) includes an elongated slot (82) and leg (106-A) includes a threadably engaged pin (84) which allows leg (106-A) to be slidably adjustably retained within slot (82) within horizontal member (18).

It is to be further noted that support arms (78) and (106) may be interchanged as both are of a shape and size to fit within either first horizontal member (16) or second horizontal member (18).

Furthermore, ring mandrel support assembly (arrow 126) with attached fourth support arm (122), and tweezers attachment means may be attached to either first support arm (78) or third support arm (106), as both protrusion (94) and fourth support arm (122) are substantially of a size and shape to fit within either second support arm (78) or third support arm (106).

Still further, if the user desires the workstation to be positioned higher, the user can remove, invert, and reattach second vertical tubular member (15), whereby, elongated L-shaped support arm (44) which is attached to member (15) may be inserted downwardly into third vertical tubular member (46). Thus, the entire workstation excluding C-clamp (52), is positioned higher than as previously described.

It will now be seen we have herein provided a workstation which is portable, and which is especially useful for electricians, computer technicians, jewelers, or any profession which involves soldering as we include a solder pad housing with a solder pad.

It will further be seen that we herein provide a workstation, which includes a combination of specific tools typically used within the above noted professions, such as an anvil block, a ring mandrel and the above stated solder pad.

It will also be seen we have herein provided a workstation that is removably attachable to a workbench, worktable, or the like.

Still further it will now be seen we have herein provided a workstation which is completely adjustable between various positions of choice, and allows either tweezers or the ring mandrel to be adjusted substantially into any position of user choice.

It will also now be seen we have herein provided a workstation which holds a work-piece, such as a ring, in a very secure manner.

It will also now be seen we have herein provided at least a first and a second adjustable attachment means for removably, adjustably attaching in combination, either a first and a second pair of gripping members, such as a first and a second pair of tweezers, and/or in combination a gripping member and a ring mandrel simultaneously, to the workstation.

Still further it will now be seen we have herein provided a workstation which is easily disassembled, and is easily packaged for shipping or selling off the store shelf.

It will now also be seen we have herein provided a workstation which can be made from substantially any suitable material of choice, such as metal, aluminum, plastic, wood, etc.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

Having described our invention, what we claim as new and desire to secure by Letters Patent is:

1. A craftsman's portable workstation comprising in combination of: a T-shaped base comprising: a first vertical tubular member; a second vertical tubular member; a first horizontal tubular member; and a second horizontal tubular member; said first vertical tubular member being fixedly attached to said first horizontal member, said first vertical tubular member being fixedly attached to said second horizontal member, said first horizontal member being opposed to said second horizontal member, a solder pad housing having a raised vertical outside rim and a centrally located vertical bore, said first vertical tubular member having removable attachment means for removably attaching said solder pad housing to said first vertical tubular member, a first L-shaped support arm having a horizontal long leg and a vertical short leg, said second vertical tubular member being fixedly attached to said horizontal long leg, said vertical short leg having removable attachment means for removably adjustably attaching a C-clamp to said vertical short leg, said C-clamp being removably attachable to an edge of a worktable, a second L-shaped support arm having a horizontal long leg and a vertical short leg, said first horizontal tubular member having removable attachment means for removably slidably attaching said first horizontal tubular member to said horizontal long leg of said second L-shaped support arm, said vertical short leg of said second L-shaped support arm having removable attachment means for removably adjustably attaching a gripping member to said vertical short leg of said second L-shaped support arm, a third L-shaped support arm having a horizontal long leg and a vertical short leg, said second horizontal tubular member having removable attachment means for removably slidably attaching said horizontal long leg of said third L-shaped support arm to said second horizontal tubular member, and said vertical short leg of said third L-shaped support arm having removable attachment means for removably adjustably attaching a ring mandrel support assembly to said vertical short leg of said third L-shaped support arm.

2. The workstation of claim 1, further includes said vertical short leg of said third L-shaped support arm having removable attachment means for removably adjustably attaching a second gripping member to said vertical short leg of said third L-shaped support arm, whereby;

said workstation supports said gripping member and said second gripping member simultaneously.

3. The workstation of claim 1 wherein said first vertical tubular member having removable attachment means for removably attaching said solder pad housing to said first vertical tubular member, said removable attachment means comprising: a threaded bolt, said bolt being inserted into said bore, into said first vertical tubular member, into said second vertical tubular member, into and throughout a washer, and said bolt being secured in place by a nut, whereby;

said first vertical tubular member is removably fixedly attached to said solder pad housing, and said second vertical tubular member is capable of rotating 360 degrees horizontally around said bolt.

4. The workstation of claim 1 wherein said vertical short leg having removable attachment means for removably adjustably attaching said C-clamp to said vertical short leg, said attachment means comprising: a third vertical tubular member, said third vertical tubular member being fixedly attached to said C-clamp, said third vertical tubular member having a horizontal threaded bore there through, said bore being of a shape and size to threadably receive a threaded screw therein, said vertical short leg being removably adjustably slidably engaged within said third vertical tubular member, and said third vertical tubular member being secured in place by said screw.

5. The workstation of claim 1 wherein said first horizontal tubular member having removable attachment means for removably slidably attaching said first horizontal tubular member to said horizontal long leg of said second L-shaped support arm, said attachment means comprising: said first horizontal tubular member having a horizontal threaded bore, said threaded bore being of a shape and size to threadably receive a threaded bolt therein, said first horizontal tubular member being of a shape and size to slidably adjustably receive said horizontal long leg of said second L-shaped support arm, and said horizontal long leg of said second L-shaped support arm is secured in place by said bolt.

6. The workstation of claim 1 wherein said vertical short leg of said second L-shaped support arm having removable attachment means for removably adjustably attaching said gripping member to said vertical short leg of said second L-shaped support arm, said removable attachment means comprising: a first vertical tubular insert member having a bottom end and a top end, a second vertical tubular insert member having a ball joint extension, said bottom end of said vertical tubular insert member having an integrally formed vertical protrusion, said protrusion being of a shape and size to be slidably engaged within said vertical short leg of said second L-shaped support arm, said vertical short leg of said second L-shaped support arm having a horizontal threaded bore, said horizontal threaded bore being of a shape and size to threadably receive a first threaded screw, said protrusion of said vertical tubular insert being removably fixedly secured within said vertical short leg of said second L-shaped support arm by said first threaded screw, said top end of said vertical tubular insert member having a horizontal recess, said recess having a horizontal threaded bore, said horizontal threaded bore of said recess being of a shape and size to threadably receive a second screw, said horizontal recess being of a shape and size to slidably removably receive said ball joint extension of said second vertical tubular insert member, said ball joint extension of said second vertical tubular insert member being fixedly removably pivotably secured within said horizontal recess by said second threaded screw, second vertical tubular insert member having a horizontal recess, said recess of said second vertical tubular insert member having a horizontal bore, said horizontal bore of said second vertical tubular insert member being of a shape and size to receive a third screw, said recess of said second vertical tubular insert member being of a shape and size to receive said gripping member, and said gripping member being removably adjustably secured within said recess of said second vertical tubular insert member by said third screw.

7. The workstation of claim 1 wherein said second horizontal tubular member having removable attachment means for removably slidably attaching said horizontal long leg of said third L-shaped support arm to said second horizontal tubular member, said removable attachment means comprising: said second horizontal tubular member having a horizontal threaded bore, said threaded bore being of a shape and size to threadably receive a threaded bolt therein, said second horizontal tubular member being of a shape and size to slidably adjustably receive said horizontal long leg of said third L-shaped support arm, and said horizontal long leg of said second L-shaped support arm being secured in place by said bolt.

8. The workstation of claim 1 wherein said vertical short leg of said third L-shaped support arm having removable attachment means for removably adjustably attaching a ring mandrel support assembly to said vertical short leg of said third L-shaped support arm, said removable attachment means comprising: a fourth L-shaped support arm having a vertical long leg and a horizontal short leg, a ring mandrel support assembly having a first bracket and a second bracket, said vertical short leg of said third L-shaped support arm having a horizontal threaded bore, said horizontal threaded bore being of a shape and size to threadably receive a threaded screw, said vertical short leg of said third L-shaped support arm being of a shape and size to slidably removably receive said vertical long leg of said fourth L-shaped support arm, said vertical long leg of said fourth L-shaped support arm being removably adjustably secured in place by said threaded screw, said top bracket having a horizontal bore, said horizontal bore of said top bracket being of a shape and size to slidably receive said horizontal short leg of said fourth L-shaped support arm, said bore of said top bracket having a vertical threaded bore, said vertical threaded bore being of a shape and size to receive a second threaded screw, said horizontal short leg of said fourth L-shaped support arm being adjustably secured in place by said second threaded screw, said top bracket and said bottom bracket each having multiple vertical threaded bores, said multiple vertical threaded bores being of a shape and size to receive elongated threaded screws, said top bracket and said bottom bracket each having a half circular toothed recess which when combined substantially form a circle, said circle being of a shape and size to adjustably receive a ring mandrel, and said top bracket and said bottom bracket being removably adjustably attached together by said elongated threaded screws whereby;

said ring mandrel is removably adjustably fixedly attached to said ring mandrel support assembly, said ring mandrel support assembly is removably adjustably attached to said fourth L-shaped support arm, and said fourth L-shaped support arm is removably adjustably attached to said third L-shaped support arm.

* * * * *